United States Patent [19]

Arbeille et al.

[11] Patent Number: 4,799,160

[45] Date of Patent: Jan. 17, 1989

[54] CLUTCH AUTOMATION DEVICE

[75] Inventors: Yves Arbeille, Verrieres-le-Buisson; Yves Drutel; Alain Viguier, both of Meudon-la-Foret, all of France

[73] Assignee: Renault Agriculture, Villacoublay, France

[21] Appl. No.: 795,943

[22] Filed: Nov. 7, 1985

[30] Foreign Application Priority Data

Nov. 7, 1984 [FR] France ................. 84 16959

[51] Int. Cl.$^4$ .............. G05D 16/20; F16D 25/14; F16D 47/06
[52] U.S. Cl. .................. 364/424.1; 192/0.055; 192/0.076; 192/3.58
[58] Field of Search ............. 364/424, 424.1; 192/0.073, 0.074, 0.075, 0.076, 3.58

[56] References Cited

U.S. PATENT DOCUMENTS

| | | | |
|---|---|---|---|
| 4,497,397 | 2/1985 | Windsor et al. | 192/0.076 |
| 4,518,064 | 5/1985 | Windsor | 192/3.58 |
| 4,553,654 | 11/1985 | Bofinger et al. | 192/0.076 |
| 4,558,772 | 12/1985 | Grimes et al. | 192/0.076 |
| 4,591,035 | 5/1986 | Ueda et al. | 192/0.076 |
| 4,591,038 | 5/1986 | Asagi et al. | 192/0.073 |
| 4,633,985 | 1/1987 | Leorat | 192/0.076 X |

FOREIGN PATENT DOCUMENTS 53444 6/1982 European Pat. Off. .

Primary Examiner—Felix D. Gruber
Attorney, Agent, or Firm—Beveridge, DeGrandi & Weilacher

[57] ABSTRACT

A device for automizing a vehicle clutch having at least one single-action hydraulic jack includes two solenoid valves or an equivalent assembly, two pulse sensors for respectively detecting the speed of the wheels and the engine speed of the vehicle, an actuating contact and an electronic cirucit connected to the solenoid valves, the sensor and the contact. The electronic circuit controls declutching and clutching to provide gradual controlled engaging of the clutch according to data relating to the engine speed and vehicle acceleration.

2 Claims, 4 Drawing Sheets

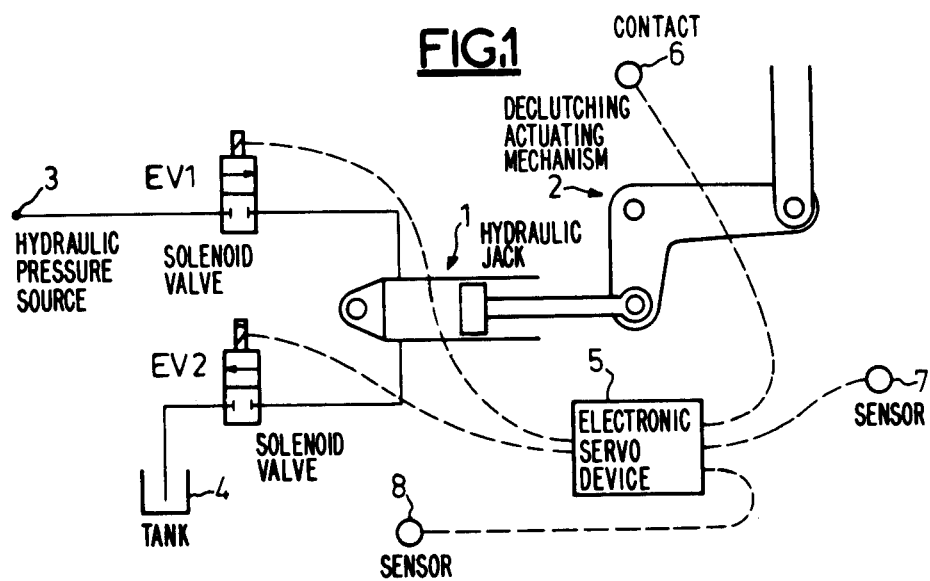
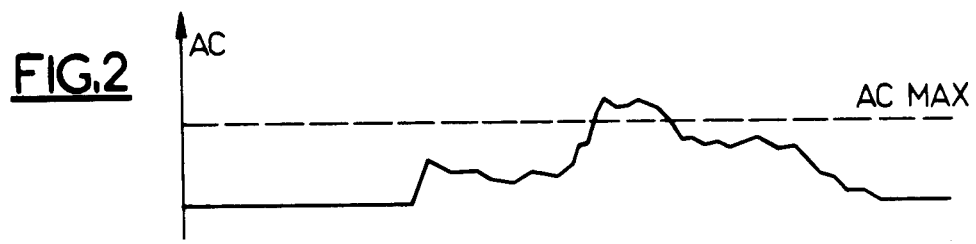
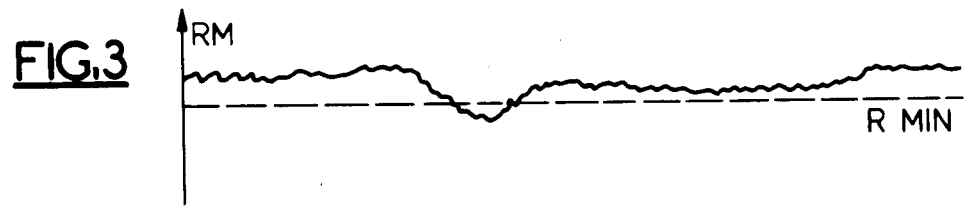
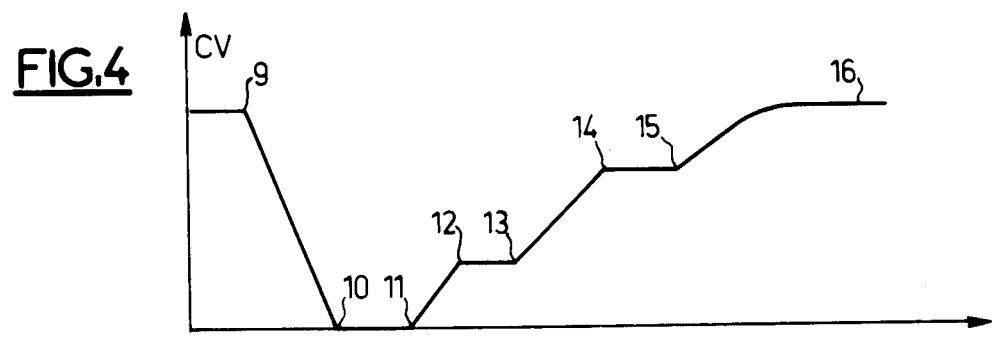

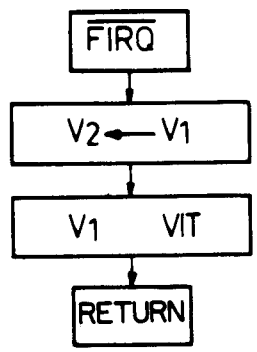
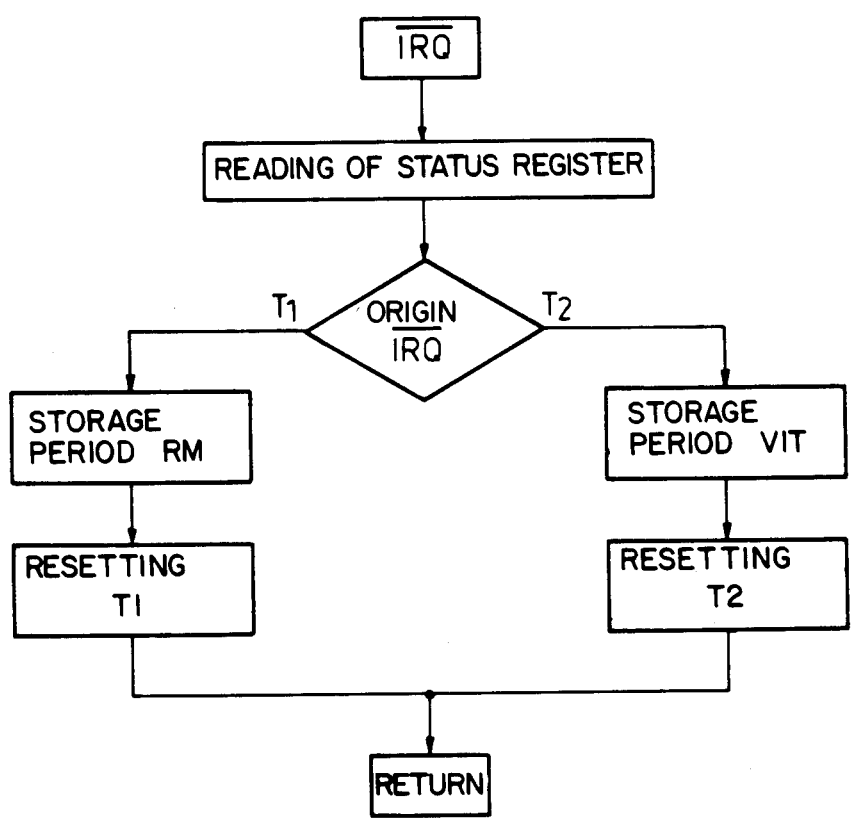

CLUTCH AUTOMATION DEVICE

BACKGROUND OF THE INVENTION

The invention relates to an automated clutch for a vehicle, in particular for an agricultural tractor.

Numerous automatic transmission devices for vehicles are known, but they are difficult to adapt to a vehicle not specially equipped for them. They are also very costly.

Automatic clutch devices which are operated by an electrical contact activated by the gear lever and which thus allow retention of the conventional mechanical gearboxes of the vehicles also are known. However, such automatic clutches which are intended to replace conventional clutches are themselves difficult to adapt to a vehicle.

SUMMARY OF THE INVENTION

The object of the invention is to retain not only the conventional mechanical gear box of the vehicle, but also the conventional dry or wet clutch normally provided with this gearbox and to automate the operation of the clutch by a device according to the present invention. It is another object of the invention to provide such a clutch automation device which is inexpensive, easily adapted to conventional clutch mechanisms and is small in size.

The invention consists in providing a single-action hydraulic jack which operates the clutch control mechanism in the declutching direction. The jack, for example, consists of a hydraulic piston already present in the clutch in the case of a hydraulic wet clutch. The invention further consists in providing two solenoid valves (or an equivalent three-way solenoid valve), one of which provides for connection of a pressure source and the jack and the other of which provides for connection of the jack and the discharge outlet. The invention further consists in providing a sensor for detecting wheel speed and a sensor for detecting engine speed, wherein these two sensors are of the electronic pulse type which generate a pulse whenever the wheels or drive shaft perform one revolution of rotate through a given angle, respectively. The invention still further consists in providing a suitable actuating contact, for example a contact of the usual type inserted in the gear lever control mechanism and activated each time a sufficient force is exerted on this lever in the gear changing direction. Finally, the invention consists in providing an electronic device which takes into account the information received from the two sensors and the contact in order to energize the solenoid valves to obtain the desired result.

Preferably, the two solenoid valves are operated by pulses of a given frequency and only the duration of the pulses within each cycle are varied between at least two values representing a relatively long time and a relatively short time. The two times are preferably a fraction of the corresponding period. The electronic control device acts in successive processing cycles and determines the frequency by counting using a clock signal. The relatively long and short times also are determined by counting and in accordance with the result of the processing operations, the linear acceleration of the vehicle, determined by means of the calculation, is controlled to not exceed a preset value and the engine speed, measured initially during declutching, is controlled so as not to drop by an amount greater than a given value.

BRIEF DESCRIPTION OF THE DRAWINGS

Further details of the present invention will be made more apparent from the following description of a preferred embodiment with reference to the drawings in which:

FIG. 1 is a diagram in partial schematic form of a control device according to the present invention;

FIGS. 2 and 3 and 4 are plots respectively showing, as a function of time, the linear acceleration of a vehicle, the speed of the engine of such vehicle and the travel distance of the jack;

FIGS. 7 and 8 are flow charts for the interrupt programs corresponding, respectively, to two types of interrupts.

DETAILED DESCRIPTION OF A PREFERRED EMBODIMENT

Figure 5:
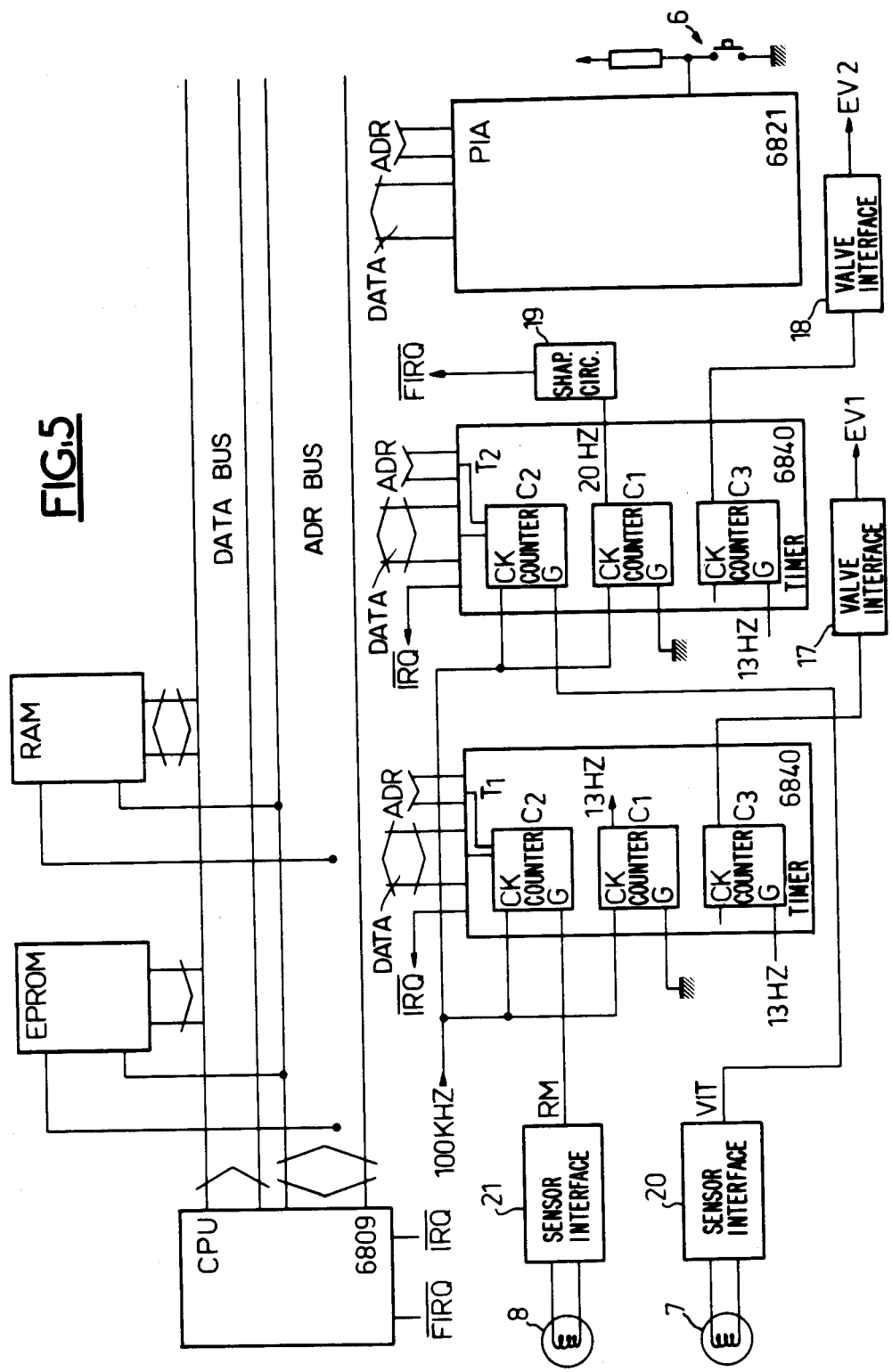
FIG. 5 is block diagram of an electronic circuit suitable for incorporation into the control device of FIG. 1.

It is particularly easy to install the device according to the invention on a vehicle having a hydraulic pressure source, such as an agricultural tractor for example. The following discussion assumes such a vehicle having a pressure source. Of course, in the case of a vehicle without such a hydraulic pressure system, it would also be possible to install a hydraulic pressure generator driven by the engine.

The automation device according to the invention comprises a single-action hydraulic jack 1 which, when pressurized, moves the conventional declutching actuating mechanism 2 in the declutching direction. The device includes two solenoid valves. One solenoid valve EV1, connects the jack to the pressure source 3 and the other EV2, connects the jack to the tank 4 in the hydraulic circuit for releasing pressure in the jack.

Energization of valve EV1 causes the clutch to disengage, while energization of valve EV2 would cause the clutch to engage, but withan unacceptable abruptness. This abruptness necessitates a servo device according to the invention to control engagement of the clutch in a gradual manner.

The objectives of the servo system of the present invention are to prevent contemporaneously:

an unacceptable drop in engine speed (which drop risks stalling), an excessively high linear acceleration of the vehicle (which acceleration reduces comfort) and an excessively long clutch engaging time (which engaging time risks unnecessary wear of the linings).

This servo system is achieved by using an electronic device 5 which receives at its input, a signal for activating or deactivating a suitable electrical contact 6. Contact 6, for example, could be the usual electrical contact incorporated in the gear lever (not shown) of the gear box so that it is activated when a force in the gear-changing direction is exerted on the lever (not shown) to disengage the clutch. The contact is placed in a deactivated state when the lever is released in order to gradually engage the clutch. In addition, the device 5 also receives at its inputs the signals applied by the two sensors 7 and 8 to enable determination of the vehicle wheel speed and the engine speed respectively. The sensors could consist of contactless magnetic sensors which detect the movement of the teeth of a rotatable member connected to rotate in proportion to the rotation of the wheels and the drive shaft, respectively. Each pulse received corresponds to a certain distance travelled by the vehilce or to a certain angle of rotation of the drive shaft, respectively. Finally, the device 5 provides output currents for operating the solenoid valves EV1 and EV2.

The mode of operation of the servo device 5 is relatively simple and is illustrated in FIGS. 2, 3 and 4 which respectively show as functions of time, the acceleration AC of the vehicle, determined by the difference in the speeds measured by sensor 7 during two successive measuring cycles, the engine speed RM, measured by sensor 8, and the distance of travel CV of the jack 1 as the solenoid valves are operated.

If, at the time represented by the point 9 on the plot of FIG. 4, the contact 6 is activated indicating a gear change, the device 5 causes solenoid EV1 to open. Opening of solenoid EV1 results in the descending ramp 9, 10 and the horizontal depression 10, 11 i.e. declutching for the time required to change gear. At the time represented by the point 11, the contact 6 is no longer activated and the servo system controls the clutch to gradually engage.

During this engaging action, solenoid EV2 is open. Solenoid EV2 is opened at the time corresponding to the point 11 and remains so until the time at point 12 is reached. At this instant, sensor 8 detects that the engine speed has fallen below a predetermined value RMIN (FIG. 3). In this situation, the device 5 closes the two solenoid valves in order to maintain the pressure of the clutch but not to accentuate it. The device then waits for the vehicle to gain speed and for the clutch to stop slipping to allow the engine speed to return to a speed exceeding the minimum value. At the instant represented by the point 13, solenoid EV2 is opened which results in another ascending ramp 13, 14 corresponding to a gradual increase in the engaging torque. It has been supposed that, at the time corresponding to the point 14, the vehicle's acceleration is detected (FIG. 2) as having surpassed a predetermined value ACMAX. As before, power to the two solenoid valves is then controlled so as to allow the vehicle time to increase its speed while reducing its acceleration, until the acceleration falls below the limit value, which occurs at the point 15. After that, the plot of CV versus time begins to ascend again when the solenoid value EV2 is opened and this plot continues to ascend until the clutch is fully engaged at 16.

It can be seen, therefore, that the automatic control process includes the step of controlling the release of pressure through solenoid valve EV2.

Moreover, for reasons of safety, it is possible to control declutching by opening solenoid valve EV1 if, for any reason, the engine speed falls below the minimum engine speed to prevent stalling.

The slopes of the descending ramps and in particular of the ascending ramps of the graph of FIG. 4 obviously may be adjusted by means of suitable chokes arranged in the hydraulic lines. However, in practice, it is preferable to operate solenoid valves EV1 and EV2 by pulsed currents which have a constant frequency and a variable cyclical ratio without ever completely opening or closing the valves. By way of example, it is possible to use a period of 77 ms, corresponding to a frequency of 13 Hz, and to use within each period a current carrying time varying between a relatively long time of 16 ms and a relatively short time of 10 ms. In this case, if for example valve EV1 is activated for the shorter time and valve EV2 for the longer time, not only is the oil flow time inside each solenoid valve merely a fraction of the total time, which thus corresponds to a reduction of the flow rate to a certain percentage of the flow rate for the fully open position, but, in addition, since the filling valve (EV1) and the relief valve (EV2) are open at the same time, it is the difference in flow rates which is taken into account. The use of fine-adjustment chokes is thereby avoided.

The servo device 5 may be implemented in accordance with the diagram shown in FIG. 5.

According to FIG. 5, the device comprises a CPU formed of, for example, of a 6809 microprocessor with an EPROM and a RAM, as well as two timers T1 and T2 which, for example, are formed of integrated circuits 6840, and finally a parallel interface adapter PIA formed of a 6821 integrated circuit. The various integrated circuits obviously are connected in the usual manner. The device includes a data bus and an address bus as shown in FIG. 5.

Each of the timers T1 and T2 has three counters C1, C2 and C3. Each counter comprises a clock input CK, a control input G and an output. The clock inputs of the counters C1 and C2 of the two timers are provided with a 100 KHz external clock signal while the clock input for the counter C3 of each timer is provided with an internal clock signal in each corresponding timer circuit, which internal clock signal has a higher frequency, for example 1 MHz, in order to improve accuracy.

The counter C1 of timer T1, the control input G of which is permanently activated, supplies is 13 Hz clock signal which is applied to the control inputs G of the two counters C3. The counters C3 are arranged to be monostable, i.e. to supply an output signal when triggered by each 13 Hz pulse until the corresponding counter C3 has counted a given number between two values which correspond to the two above mentioned current carrying periods. The preselected numbers are supplied by the microprocessor over the data bus. The output signals from counters C3 are amplified by power interfaces 17 and 18 respectively to supply power to the solenoid valves EV1 and EV2, respectively.

The counter C1 of timer T2 supplies a 20 Hz clock signal which, after being shaped in a shaping circuit 19, is applied to the input FIRQ of the microprocessor CPU in order to cause the microprocessor to calculate vehicle acceleration every 50 ms.

The counters C2 of timers T1 and T2 enable the engine speed and the speed of travel to be measured, respectively, using the 100 KHz signal. The sensors 7 and 8 for enabling detection of the speed of travel and the engine speed activate, by means of shaping interfaces 20 and 21 respectively, the control inputs G of the counters C2 of the timers T1 and T2 respectively.

In response to a descending edge from its corresponding sensor, each counter C2 applies an interrupt signal to the line $\overline{\text{IRQ}}$ of the CPU. The microprocessor is then interrupted in order to measure the contents of the corresponding counter C2 via the data bus. Such measurements, i.e. of the travel speed or engine speed, are therefore carried out more frequency with greater travel or engine speed.

The parallel interface adapter PIA serves simply to determine whether the contact 6 is open or closed.

Figure 6:
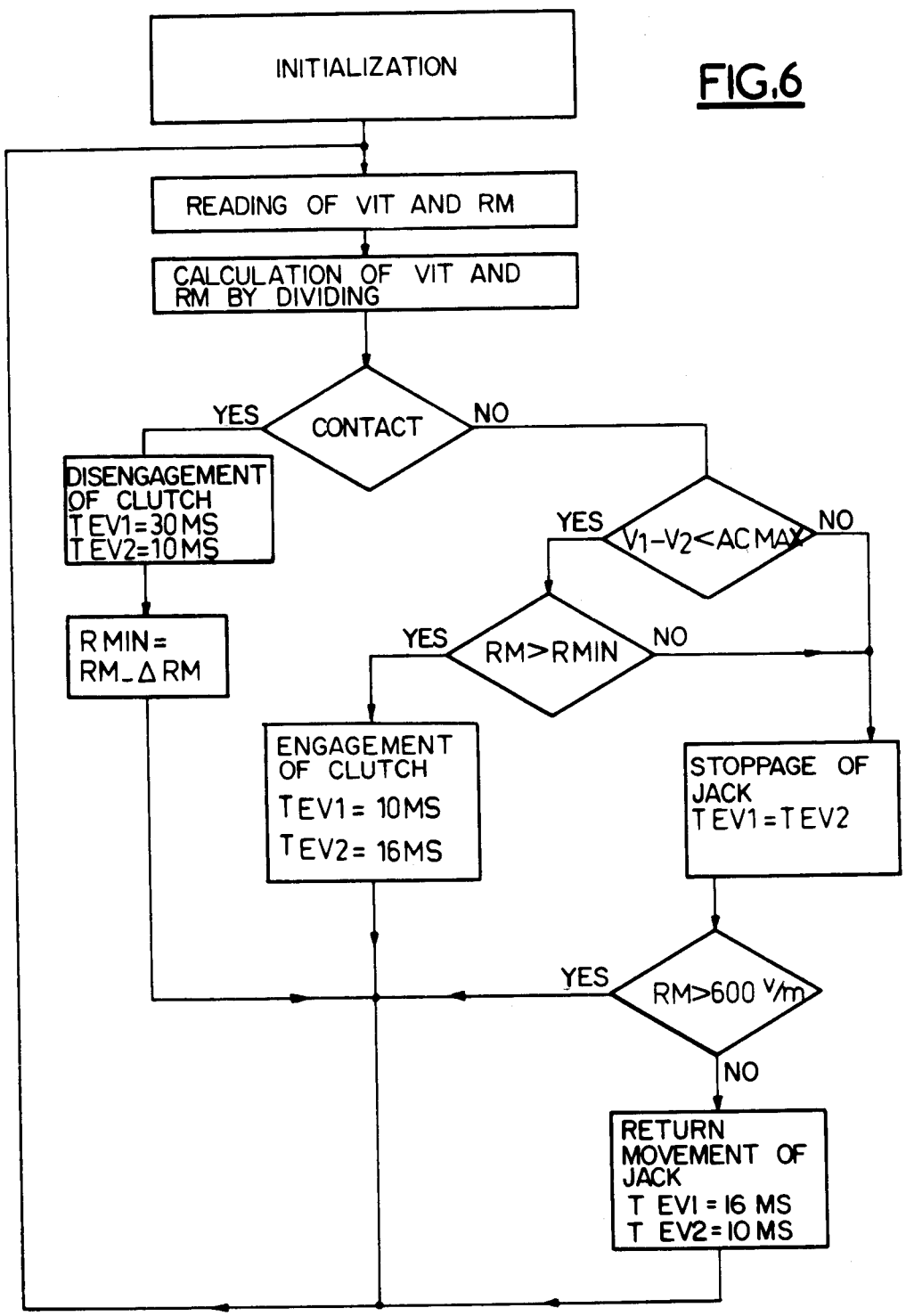
FIG. 6 is a flow chart useful for understanding the calculations and decision-making tests performed by the circuit of FIG. 5.

The program for the microprocessor is contained in the EPROM and corresponds to the flow chart shown in FIG. 6. With reference to FIG. 6, after an initialization phase during which the values of the various constants are loaded, a loop is started during which the data proportional to the wheel speed VIT and the engine speed RM are read in succession. The corresponding values VIT and RM are calculated by means of division. Then, it is determined whether the contact 6 is closed or open from the PIA.

If the contact 6 is closed, declutching is performed by setting the current carrying time for the solenoid valve 1 at a value greater than the current carrying time for the solenoid valve 2, these values being loaded in the counters C3. Then, the value of the minimum acceptable speed is calculated by establishing the difference between the actual value of the speed and the permitted drop, designated ΔRM, after which a loopback is performed. If, on the other hand, the contact 6 is not closed, the clutch is gradually engaged. In this respect, if the difference V1−V2 is less than the maximum permissible acceleration ACMAX, and if the engine speed is greater than the predetermined minimum speed RMIN, the clutch is caused to engage by fixing the current-carrying time of the solenoid valve 1 at the lower value of 10 ms and the current-carrying time of the solenoid valve 2 at the higher value of 16 ms. If this is not the case, movement of the jack is stopped by fixing the two current carrying times at the same values, for example 10 ms. After the jack has been stopped, it is determined whether RM is greater than the minimum engine speed or a speed which risks engine stalling, for example 600 rpm, and, if this is the case, a loopback is performed. If this is not the case, the jack is made to move in the opposite direction whereby the clutch is made to engage by fixing the current-carrying time for valve EV1 at the higher value and the current-carrying time for valve EV2 at the lower value, after which a loopback is performed.

FIG. 7 shows the first interrupt program: each time the signal $\overline{FIRQ}$ is applied to the microprocessor, the latter transfers the value of the variable V1 to the variable V2 and the value of the variable VIT to the variable V1 to update the last two speeds recorded, and then effects a return.

FIG. 8 shows the interrupt flow chart for the second interrupt input $\overline{IRQ}$ which first caused reading of the microprocessor status register to enable a determination as to whether the interrupt signal originated from timer T1 or T2. If the interrupt originates from timer T1, the period RM, ie. the contents of the counter C2 of timer T1, is stored and timer T1 is reset. If the interrupt originates from timer T2, the period VIT measured at the counter C2 of timer T2 is stored and timer T2 is reset.

To summarize, it can be seen that with the invention it is possible to achieve the required function, i.e. completely automatic operation of the clutch each time the gear lever is operated, with means which are simple, have small dimensions and are easily fitted, i.e. a hydraulic jack, solenoid valves, sensors and an electrical contact, as well as an extremely simple electronic control circuit.

We claim:

1. A device for controlling engagement of a hydraulic clutch having a jack, said device comprising:
    a first hydraulic control valve having a first solenoid for regulating fluid flow from a pressurized hydraulic fluid source to the jack to urge the clutch to engage;
    a second hydraulic control valve having a second solenoid for regulating fluid from the jack to a reservoir to allow the clutch to disengage;
    an actuating contact for providing a clutch operation signal indicating operation of the clutch;
    a first pulse sensor for monitoring engine speed of a vehicle and providing an engine speed signal proportional to the monitored vehicle engine speed;
    a second pulse sensor for monitoring wheel speed of a vehicle and providing a wheel speed signal proportional to the monitored vehicle wheel speed; and
    electronic control circuitry responsive to the clutch operation signal for controlling the first and second hydraulic valves to cause the clutch to engage gradually, the electronic control circuitry including calculating means, valve control signal generating means, and means for regulating the valve control signal generating means; the calculating means receiving the engine speed signal and the wheel speed signal from the pulse sensors and calculating the vehicle engine speed and wheel speed therefrom, the valve control signal generating means generating first and second pulsed valve control signals having a common constant frequency and having current carrying times limited to vary between, but without reaching, a current carrying time causing constant energization of the solenoids and a current carrying time insufficient for energization of the solenoids, and the regulating means regulating the valve control signal generating means according to the engine speed and wheel speed of the vehicle as calculated by the calculating means to alternatively generate the first valve control signal with a relatively greater current carrying time than the second valve control signal, to cause the jack to be filled with fluid passed by the first control valve, or the first valve control signal with a relatively lesser current carrying time than the second valve control signal, to cause the jack to discharge fluid through the second control valve.

2. A device as claimed in claim 1, wherein:
    (a) the electronic control circuitry comprises means for applying clock signals to the valve control signal generating means;
    (b) the means for regulating the valve control signal generating means comprises a microprocessor including a central processing unit, a read only memory and a read-write memory;
    (c) the valve control signal generating means comprises
        (i) interrupt means,
        (ii) a first timer connected to the first pulse sensor and the clock signal applying means and having first counter means for counting applied clock pulses received between successive pulses from the first pulse sensor and providing data indicative thereof to the microprocessor after interruption of the microprocessor by the interrupt means, and
        (iii) a second timer connected to the second pulse sensor and the clock signal applying means and having second counter means for counting applied clock pulses received between successive pulses received from the second pulse sensor and providing data indicative thereof to the microprocessor after interruption of the microprocessor by the interrupt means; and (d) the central processing unit includes means operative after interruption of the microprocessor by the interrupt means for (i) calculating wheel speed, engine speed, and vehicle acceleration vlues from the provided data and determining therefrom the constant frequency and the current carrying times for the valve control signals, (ii) determining a constant frequency for calculating acceleration, and (iii) causing the valve control signal generating means to generate the first and second valve control signals accordingly.

* * * * *